US011475158B1

(12) United States Patent
Zhang et al.

(10) Patent No.: US 11,475,158 B1
(45) Date of Patent: *Oct. 18, 2022

(54) CUSTOMIZED DEEP LEARNING CLASSIFIER FOR DETECTING ORGANIZATION SENSITIVE DATA IN IMAGES ON PREMISES

(71) Applicant: Netskope, Inc., Santa Clara, CA (US)

(72) Inventors: Yi Zhang, Santa Clara, CA (US); Dong Guo, San Jose, CA (US); Yihua Liao, Fremont, CA (US); Siying Yang, Cupertino, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,816

(22) Filed: Jul. 26, 2021

(51) Int. Cl.
*G06F 21/62* (2013.01)
*G06N 3/02* (2006.01)
(Continued)

(52) U.S. Cl.
CPC ....... *G06F 21/6245* (2013.01); *G06K 9/6267* (2013.01); *G06N 3/02* (2013.01); *G06V 30/413* (2022.01)

(58) Field of Classification Search
CPC .............. G06F 21/6245; G06V 30/413; G06K 9/6267; G06N 3/02
(Continued)

(56) References Cited

U.S. PATENT DOCUMENTS 5,452,460 A 9/1995 Distelberg et al.
6,829,654 B1 12/2004 Jungck
(Continued)

FOREIGN PATENT DOCUMENTS

EP 2378455 A2 10/2011
EP 2544117 A1 1/2013
(Continued)

OTHER PUBLICATIONS

Jacobsen, Jörn-Henrik, Arnold Smeulders, and Edouard Oyallon. "i-revnet: Deep invertible networks." arXiv preprint arXiv:1802.07088 (2018). (Year: 2018).*

(Continued)

*Primary Examiner* — Syed A Zaidi
(74) *Attorney, Agent, or Firm* — Haynes Beffel & Wolfeld LLP; Ernest J. Beffel, Jr.

(57) ABSTRACT

Disclosed is a method of building a customized deep learning (DL) stack classifier to detect organization sensitive data in images, referred to as image-borne organization sensitive documents, and protecting against loss of the image-borne organization sensitive documents, including distributing a trained feature map extractor stack with stored parameters to an organization, under the organization's control, configured to allow the organization to extract from image-borne organization sensitive documents, feature maps that are used to generate updated DL stacks, without the organization forwarding images of organization-sensitive training examples, and to save non invertible feature maps derived from the images, and ground truth labels for the image. Also included is receiving organization-specific examples including the non-invertible feature maps extracted from the organization-sensitive documents and the ground truth labels and using the received organization-specific examples to generate a customer-specific DL stack classifier. Further included is sending the customer-specific DL stack classifier to the organization.

20 Claims, 10 Drawing Sheets

(51) Int. Cl.
*G06K 9/62* (2022.01)
*G06V 30/413* (2022.01)

(58) Field of Classification Search
USPC .......................................................... 726/26
See application file for complete search history.

(56) References Cited

U.S. PATENT DOCUMENTS

| | | | |
|---|---|---|---|
| 7,272,646 | B2 | 9/2007 | Cooper et al. |
| 7,478,434 | B1 | 1/2009 | Hinton et al. |
| 7,587,499 | B1 | 9/2009 | Haghpassand |
| 8,346,580 | B2 | 1/2013 | Nakfoor |
| 8,429,745 | B1 | 4/2013 | Casaburi et al. |
| 8,544,060 | B1 | 9/2013 | Khetawat |
| 8,572,757 | B1 | 10/2013 | Stamos et al. |
| 8,844,059 | B1 | 9/2014 | Manmohan |
| 8,856,869 | B1 | 10/2014 | Brinskelle |
| 9,137,131 | B1 | 9/2015 | Sarukkai et al. |
| 9,197,628 | B1 | 11/2015 | Hastings |
| 9,565,202 | B1 | 2/2017 | Kindlund et al. |
| 9,697,349 | B2 | 7/2017 | Li et al. |
| 9,716,724 | B1 | 7/2017 | Chennuru et al. |
| 9,917,817 | B1 | 3/2018 | Lad et al. |
| 10,068,071 | B2 | 9/2018 | Shaw et al. |
| 10,404,755 | B2 | 9/2019 | Narayanaswamy et al. |
| 10,404,756 | B2 | 9/2019 | Narayanaswamy et al. |
| 10,462,165 | B1 | 10/2019 | Salour |
| 10,540,518 | B2 | 1/2020 | Ishida et al. |
| 2003/0135465 | A1 | 7/2003 | Lee et al. |
| 2004/0095601 | A1* | 5/2004 | Ozawa .................... H04N 1/41 358/1.15 |
| 2004/0205360 | A1 | 10/2004 | Norton et al. |
| 2005/0276439 | A1* | 12/2005 | Ishii .................. H04N 1/32208 382/100 |
| 2006/0075481 | A1 | 4/2006 | Ross et al. |
| 2007/0006293 | A1 | 1/2007 | Balakrishnan et al. |
| 2009/0022319 | A1 | 1/2009 | Shahaf et al. |
| 2009/0044260 | A1 | 2/2009 | Niglio et al. |
| 2009/0232300 | A1 | 9/2009 | Zucker et al. |
| 2009/0248417 | A1* | 10/2009 | Latorre .................. G10L 13/10 704/266 |
| 2009/0296926 | A1 | 12/2009 | Perlman |
| 2011/0264906 | A1 | 10/2011 | Pourzandi et al. |
| 2011/0277027 | A1 | 11/2011 | Hayton et al. |
| 2012/0023323 | A1 | 1/2012 | Kent, Jr. et al. |
| 2012/0106366 | A1 | 5/2012 | Gauvin |
| 2012/0144189 | A1 | 6/2012 | Zhong |
| 2012/0151551 | A1 | 6/2012 | Readshaw et al. |
| 2012/0204260 | A1 | 8/2012 | Cecil et al. |
| 2012/0278872 | A1 | 11/2012 | Woelfel et al. |
| 2013/0006865 | A1 | 1/2013 | Spates |
| 2013/0024942 | A1 | 1/2013 | Wiegenstein et al. |
| 2013/0055342 | A1 | 2/2013 | Choi et al. |
| 2013/0145483 | A1 | 6/2013 | DiMuro et al. |
| 2014/0007182 | A1 | 1/2014 | Qureshi et al. |
| 2014/0026182 | A1 | 1/2014 | Pearl et al. |
| 2014/0259190 | A1 | 9/2014 | Kiang et al. |
| 2014/0344573 | A1 | 11/2014 | Tsai et al. |
| 2015/0019870 | A1 | 1/2015 | Patnala et al. |
| 2015/0095022 | A1* | 4/2015 | Xu ....................... G06V 30/416 704/10 |
| 2015/0100357 | A1 | 4/2015 | Seese et al. |
| 2015/0135302 | A1 | 5/2015 | Cohen et al. |
| 2015/0142986 | A1 | 5/2015 | Reznik et al. |
| 2015/0312227 | A1 | 10/2015 | Follis et al. |
| 2016/0044035 | A1 | 2/2016 | Huang |
| 2016/0094483 | A1 | 3/2016 | Johnston et al. |
| 2016/0246999 | A1 | 8/2016 | Pielot |
| 2018/0293400 | A1 | 10/2018 | Borup et al. |
| 2019/0019020 | A1 | 1/2019 | Flament et al. |
| 2019/0171794 | A1 | 6/2019 | Dhruva et al. |
| 2019/0236352 | A1 | 8/2019 | Duke et al. |
| 2019/0325276 | A1 | 10/2019 | Fu et al. |
| 2020/0076842 | A1 | 3/2020 | Zhou et al. |
| 2020/0104603 | A1 | 4/2020 | Zucker et al. |
| 2020/0125728 | A1 | 4/2020 | Savir et al. |
| 2020/0175384 | A1* | 6/2020 | Zhang .................. G06N 3/0454 |
| 2020/0210924 | A1 | 7/2020 | Ghosh et al. |
| 2021/0027468 | A1* | 1/2021 | Madabhushi ........... G06T 7/337 |
| 2021/0049357 | A1* | 2/2021 | Sarkar .................... G06K 9/627 |
| 2021/0181086 | A1* | 6/2021 | Chou .................... G06T 1/0014 |
| 2021/0319560 | A1* | 10/2021 | Xia ........................ G06V 10/82 |
| 2022/0148241 | A1* | 5/2022 | Park ..................... G06N 3/0454 |

FOREIGN PATENT DOCUMENTS

| | | |
|---|---|---|
| WO | 2006109187 A2 | 10/2006 |
| WO | 2008017008 A2 | 2/2008 |
| WO | 2009094654 A1 | 7/2009 |
| WO | 2014141045 | 9/2014 |
| WO | 2015002875 A1 | 1/2015 |

OTHER PUBLICATIONS

Dwivedi, Rudresh, and Somnath Dey. "A non-invertible cancelable fingerprint template generation based on ridge feature transformation." arXiv preprint arXiv:1805.10853 (2018). (Year: 2018).*
NPL Search Terms (Year: 2022).*
"Convolutional Neural Network", Learn Convolutional Neural Network from basic and its implementation in Keras, Feb. 24, 2019, https://towardsdatascience.com/convolutional-neural-network-cb0883dd6529, pp. 1-15.
Cheng et al., "Cloud Security For Dummies, Netskope Special Edition," John Wiley & Sons, Inc. 2015.
"The Netskope Advantage: Three "Must-Have" Requirements for Cloud Access Security Brokers", Jul. 2015, WP-12-2, 4 pages.
"The Netskope Active Platform Enabling Safe Migration to the Cloud", Apr. 2015, DS-1-8, Netskope, Inc., 6 pages.
"The 5 Steps to Cloud Confidence," netSkope, Inc., 2014, 11 pgs.
"Repave the Cloud-Data Breach Collision Course," netSkope, Inc., 2014, 6 pgs.
"Netskope The 15 Critical CASB Use Cases", Netskope, Inc., EB-141-1, 19 pages.
"Netskope Introspection," netSkope, Inc., 2015, 3 pgs.
"Netskope Cloud Confidence Index™," netSkope, Inc., 2015, 4 pgs.
"Cloud Data Loss Prevention Reference Architecture", Sep. 2015, Netskope, WP-88-1, 2 pages.
U.S. Appl. No. 16/891,678—Office Action dated Jul. 27, 2020, 8 pages.
U.S. Appl. No. 16/891,698—Notice of Allowance dated Aug. 10, 2020, 8 pages.
U.S. Appl. No. 16/891,698—Supplemental Notice of Allowance dated Aug. 20, 2020, 8 pages.
U.S. Appl. No. 16/891,647—Office Action dated Sep. 18, 2020, 40 pages.
Traore et al., "Deep convolution neural network for image recognition", Oct. 12, 2018, Elsevier B.V, 257-268.
Ma, Minghuang, et. al., "Democratizing Production Scale Distributed Deep Learning", Nov. 3, 2018, 12 pages.
Abadi, Martin, et. al., "TensorFlow: A system for large scale machine learning", Nov. 2-4, 2016, 21 pages.
U.S. Appl. No. 16/891,678—Notice of Allowance dated Nov. 12, 2020, 16 pages.
U.S. Appl. No. 16/891,647—Response to Office Action dated Sep. 18, 2020, filed Dec. 9, 2020, 11 pages.
U.S. Appl. No. 16/891,647—Notice of Allowance dated Dec. 31, 2020, 13 pages.
PCT/US2014/21174—International Search Report and Written Opinion, dated Aug. 29, 2014, 13 pages.
EP 14761047.1—Extended Search Report dated Aug. 4, 2016, 7 pages.
PCT/US2014/21174—International Preliminary Report on Patentability, dated Sep. 8, 2015, 10 pages.
EP 18199916.0—Extended European Search Report dated Feb. 14, 2019, 8 pages.
EP 18199916.0—Response to Extended European Search Report dated Feb. 14, 2019, as filed Sep. 20, 2019, 12 pages.

(56) References Cited

OTHER PUBLICATIONS

Office 365 Team, "Office 365—Our Latest Innovations in Security and Compliance," Microsoft Inc., Oct. 28, 2014, 6 pages, Retrieved from the Internet: <http://blogs.office.com/2014/10/28/office-365-latest-innovations-security-compliance/> [Apr. 10, 2015].
Axway, Comprehensive API and SOA 1-25 Security, Mar. 18, 2015, XP055310645, 3 Pages, Retrieved from the Internet: http://www.axway.com/sites/default/files/brief_files/axway_solutionbrief_api_soa security_en.pdf>.
Akana, "API Security: A Guide To Securing Your Digital Channels", Mar. 15, 2015, XP055312513, Sections 2 and 3, Retrieved from the Internet: <http://resource.akana.com/white-papers/api-security-a-guide-to-securing-your-digital-channels.
Akana, "API Gateway: Key Security Features", Mar. 10, 2015, 2 pages, XP055312562, Retrieved from the Internet: http://resource.akana.com/datasheets/api-gateway-security-features.
Berg et al, "Issue September/October API Governance and Management by Longji Tang, Mark Little LXXXVI Security and Identity Management Applied to SOA—Part II A Look at Service-Driven Industry Models Contents", Service Technology Magazine, Sep. 1, 2014, pp. 1-45, XP055243185, Retrieved from the Internet: URL:http://servicetechmag.com/system/application/views/I86/ServiceTechMag.com_Issue86_online.pdf.
PCT/US2016/014197—International Search Report and Written Opinion dated Mar. 24, 2017, 22 pages.
U.S. Appl. No. 14/835,640—First Action Interview Pilot ProgramPre-Interview Communication dated May 4, 2017, 8 pages.
U.S. Appl. No. 14/835,640—First Action Interview Office Action dated Aug. 7, 2017, 14 pages.
U.S. Appl. No. 14/835,632—First Action Interview Pilot Program Pre-Interview Communication dated May 31, 2017, 9 pages.
U.S. Appl. No. 14/835,632—First Action Interview Office Action dated Sep. 5, 2017, 26 pages.
U.S. Appl. No. 14/835,640—Response to First Action Interview Office Action dated Aug. 7, 2017, filed Sep. 11, 2017, 12 pages.
U.S. Appl. No. 14/835,640—Office Action dated Dec. 11, 2017, 19 pages.
U.S. Appl. No. 14/835,640—Response to Office Action dated Dec. 11, 2017, filed Dec. 22, 2017, 9 pages.
U.S. Appl. No. 14/835,640—Notice of Allowance dated Jan. 23, 2018, 11 pages.
PCT/US2016/014197—International Preliminary Report on Patentability dated Sep. 28, 2017, 15 pages.
JP 2018-500266—Request for Examination and PCT-PPH Request, along with amendments filed on Jan. 25, 2018, 22 pages.
JP 2018-500266—First Office Action dated Mar. 20, 2018, 8 pages.
EP 16763347.8—Rule 71(3) EPC Communication (Notice of Allowance) dated Jun. 1, 2018, 89 pages.
JP 2018-500266—Response to First Office Action dated Mar. 20, 2018 filed Jul. 20, 2018, 6 pages.
JP 2018-500266—Notice of Allowance dated Jul. 31, 2018, 9 pages.
U.S. Appl. No. 14/835,632—Notice of Allowance dated Jul. 12, 2018, 21 pages.
JP 2018-160069—Voluntary Amendments filed Oct. 3, 2018, 82 pages.
EP 16763347.8—Response to Rule 71(3) EPC Communication (Notice of Allowance) dated Jun. 1, 2018, as filed Oct. 11, 2018, 20 pages.
JP 2018-160069—Notice of Allowance dated Jan. 8, 2019, 8 pages.
EP 18201903.4—Extended European Search Report dated Jan. 31, 2019, 13 pages.
U.S. Appl. No. 14/198,499, filed Mar. 5, 2014, U.S. Pat. No. 9,398,102, Jul. 19, 2016, Granted.
U.S. Appl. No. 14/198,508, filed Mar. 5, 2014, U.S. Pat. No. 9,270,765, Feb. 23, 2016, Granted.
U.S. Appl. No. 14/835,640, filed Aug. 25, 2015, U.S. Pat. No. 9,928,377, Feb. 27, 2018, Granted.
U.S. Appl. No. 15/368,246, filed Dec. 2, 2016, U.S. Pat. No. 11,019,101, Sep. 14, 2017, Granted.
U.S. Appl. No. 16/891,647, filed Jun. 3, 2020, U.S. Pat. No. 10,990,856, Apr. 24, 2021, Granted.
U.S. Appl. No. 17/229,768, filed Apr. 1, 2021, Pending.
U.S. Appl. No. 16/891,678, filed Jun. 3, 2020, U.S. Pat. No. 10,949,961, Mar. 16, 2021, Granted.
U.S. Appl. No. 17/202,075, filed Mar. 15, 2021, Pending.
U.S. Appl. No. 16/891/698, filed Jun. 3, 2020, U.S. Pat. No. 10,867,073, Dec. 15, 2020, Granted.
U.S. Appl. No. 17/116,862, filed Dec. 9, 2020, Pending.
U.S. Appl. No. 15/936,269—Office Action (Pre-interview) dated Jun. 17, 2020, 13 pages.
U.S. Appl. No. 15/936,269—Office Action (First Action Interview) dated Oct. 30, 2020, 6 pages.
U.S. Appl. No. 16/128,015—Office Action dated Mar. 1, 2021, 14 pages.
U.S. Appl. No. 15/936,269—Office Action dated Apr. 8, 2021, 22 pages.
Netskope, "Data Loss Prevention and Monitoring in the Cloud", Nov. 2014, 18 pages.
Netskope, "Netskope Active Cloud DLP", 2015, 4 pages.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara etal., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Report on Patentability dated Mar. 5, 2018, 13 pages.
U.S. Appl. No. 15/368,240—Office Action dated Aug. 7, 2018, 28 pages.
U.S. Appl. No. 16/000,132—Office Action dated Oct. 2, 2018, 18 pages.
U.S. Appl. No. 15/368,240—Response to Office Action dated Aug. 7, 2018, filed Oct. 11, 2018, 25 pages.
U.S. Appl. No. 16/000,132—Response to Office Action dated Oct. 2, 2018, filed Nov. 13, 2018, 16 pages.
U.S. Appl. No. 16/000,132—Notice of Allowance dated Dec. 28, 2018, 16 pages.
U.S. Appl. No. 15/368,240—Office Action dated Feb. 8, 2019, 28 pages.
JP-20185473875—Notice of Allowance with Allowed Claims dated Mar. 25, 2019, 7 pages.
EP-17713822.9, Rule 71(3) Allowance Communication dated Mar. 8, 2019, 147 pages.
PCT/US2019/031867—International Search Reoprt and Written Opinion dated Sep. 9, 2019, 20 pages.
EP-19189235.5 Extended European Search Report dated Nov. 27, 2019, 5 pages.
U.S. Appl. No. 15/368,240—Office Action dated Dec. 26, 2019, 40 pages.
U.S. Appl. No. 15/368,246—Office Action dated Apr. 5, 2019, 40 pages.
U.S. Appl. No. 15/368,246—Response to Office Action dated Apr. 5, 2019, filed May 3, 2019, 16 pages.
U.S. Appl. No. 15/368,246—Supplemental Response to Office Action dated Apr. 5, 2019, filed Oct. 25, 2019, 8 pages.
U.S. Appl. No. 15/368,240—Response to Final Office Action dated Feb. 8, 2019 filed Apr. 19, 2019, 32 pages.
Kark et al, "Trends: Calculating the Cost of a Security Breach", Forrester Research, Inc. Apr. 10, 2007, 7 pgs.
"Data Breach: The Cloud Multiplier Effect", Ponemon Institute, Jun. 4, 2014, 27 pages.

(56) References Cited

OTHER PUBLICATIONS

Riley et al, "Magic Quadrant for Cloud Access Security Brokers", Nov. 30, 2017, 28 pages, downloaded from <<https://go.netskope.com/typ-gartner-mq-for-casb.html>>.
Lakshman et al, "Cassandra—A Decentralized Structured Storage System", 2009, 6 pages.
DeCandia et al, "Dynamo: Amazon's Highly Available Key-value Store", SOSP '07, Oct. 14-17, 2007, 16 pages.
Chang et al, "Bigtable: A Distributed Storage System for Structured Data", Operating Systems Design and Implementation, OSDI, 2006, 14 pages.
U.S. Appl. No. 15/368,246—Office Action dated Jan. 27, 2020, 20 pages.
U.S. Appl. No. 16/783,146—Office Action dated Mar. 27, 2020, 26 pages.
U.S. Appl. No. 16/783,146—Response to Office Action dated Mar. 27, 2020, filed Jun. 4, 2020, 21 pages.
U.S. Appl. No. 16/783,146—Notice of Allowance dated Jun. 17, 2020, 13 pages.
U.S. Appl. No. 15/368,240—Notice of Allowance dated Jun. 29, 2020, 22 pages.
Sumit Khurana, et. al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
U.S. Appl. No. 16/409,685—Office Action dated Jul. 14, 2020, 28 pages.
U.S. Appl. No. 15/368,246—Notice of Allowance dated Oct. 6, 2020, 22 pages.
PCT/US2019/031867—International Prelinary Report on Patentability dated Nov. 24, 2020, 12 pages.
U.S. Appl. No. 16/409,685—Notice of Allowance dated Dec. 3, 2020, 18 pages.
U.S. Appl. No. 15/368,240—Response to Office Action dated Dec. 26, 2019, filed May 26, 2020, 12 pages.
U.S. Appl. No. 15/368,246—Response to Office Action dated Jan. 27, 2020, filed May 25, 2020, 16 pages.
U.S. Appl. No. 16/409,685—Response to Office Action dated Jul. 14, 2020, filed Oct. 14, 2020, 9 pages.
U.S. Appl. No. 16/411,039—Office Action dated Feb. 10, 2021, 13 pages.
EP 19189235.5 Rule 71(3)—Intent to Grant, dated Dec. 17, 2020, 7 pages.
EP 19189235.5 Response to Rule 71(3), dated Dec. 17, 2020, 6 pages.
JP 2019081108 First Office Action, dated May 19, 2021, 7 pages.
EP 19727564.7—Voluntary Amendments filed on Dec. 22, 2020, 5 pages.
U.S. Appl. No. 14/198,499—Office Action dated May 21, 2015, 19 pages.
U.S. Appl. No. 14/198,499—Response to Office Action dated May 21, 2015, filed Feb. 16, 2016, 8 pages.
U.S. Appl. No. 14/198,499—Notice of Allowance dated Mar. 22, 2016, 11 pages.
U.S. Appl. No. 14/198,508—Response to Office Action (Interview Summary) dated Jul. 31, 2015 filed Aug. 10, 2015, 9 pages.
U.S. Appl. No. 14/198,508—Office Action (Interview Summary) dated Jul. 31, 2015, 3 pages.
U.S. Appl. No. 14/198,508—Notice of Allowance dated Dec. 10, 2015, 14 pages.
EP 14761047.1—Response to Extended Search Report dated Aug. 4, 2016 filed Feb. 28, 2017, 10 pages.
U.S. Appl. No. 15/213,250—Office Action dated Jan. 22, 2018, 25 pages.
U.S. Appl. No. 15/213,250—Response to Office Action dated Jan. 22, 2018, filed Feb. 14, 2018, 11 pages.
U.S. Appl. No. 15/213,250—Notice of Allowance dated Mar. 28, 2018, 9 pages.
EP 14761047.1—Notice of Allowance dated Jun. 1, 2018, 45 pages.
U.S. Appl. No. 15/990,507—First Action Interview Pilot Program Pre-Interview Communication dated Jan. 31, 2019, 12 pages.
U.S. Appl. No. 15/990,509—First Action Interview Pilot Program Pre-Interview Communication dated Jan. 31, 2019, 12 pages.
U.S. Appl. No. 15/990,512—First Action Interview Pilot Program Pre-Interview Communication dated Jan. 31, 2019, 12 pages.
U.S. Appl. No. 15/990,507—Response to First Action Interview Pilot Program Pre-Interview Communication dated Jan. 31, 2019, filed Mar. 12, 2019, 12 pages.
U.S. Appl. No. 15/990,509—Response to First Action Interview Pilot Program Pre-Interview Communication dated Jan. 31, 2019, filed Mar. 12, 2019, 11 pages.
U.S. Appl. No. 15/990,512—Notice of Allowance dated Jul. 29, 2019, 9 pages.
U.S. Appl. No. 16/554,482—Office Action dated Dec. 15, 2020, 25 pages.
"Convolutional Neural Network", Towards Data Source, Feb. 24, 2019, 15 pages, (downloaded from https://towardsdatascience.com/covolutional-neural-network-cb0883dd6529).
"The Dark Side of the Cloud", NetSkope, Inc, Feb. 2020, 10 pages.
EP 21177651.3—Extended European Search Report dated Nov. 3, 2021, 8 pages.
Ricardo Batista Da Neves Junior et al., "A Fast Fully Octave Convolutional Neural Network for Document Image Segmentation", Cornell University Library, Apr. 3, 2020 . 8 pages.
U.S. Appl. No. 17/116,862—Office Action dated Apr. 26, 2022, 7 pages.

\* cited by examiner

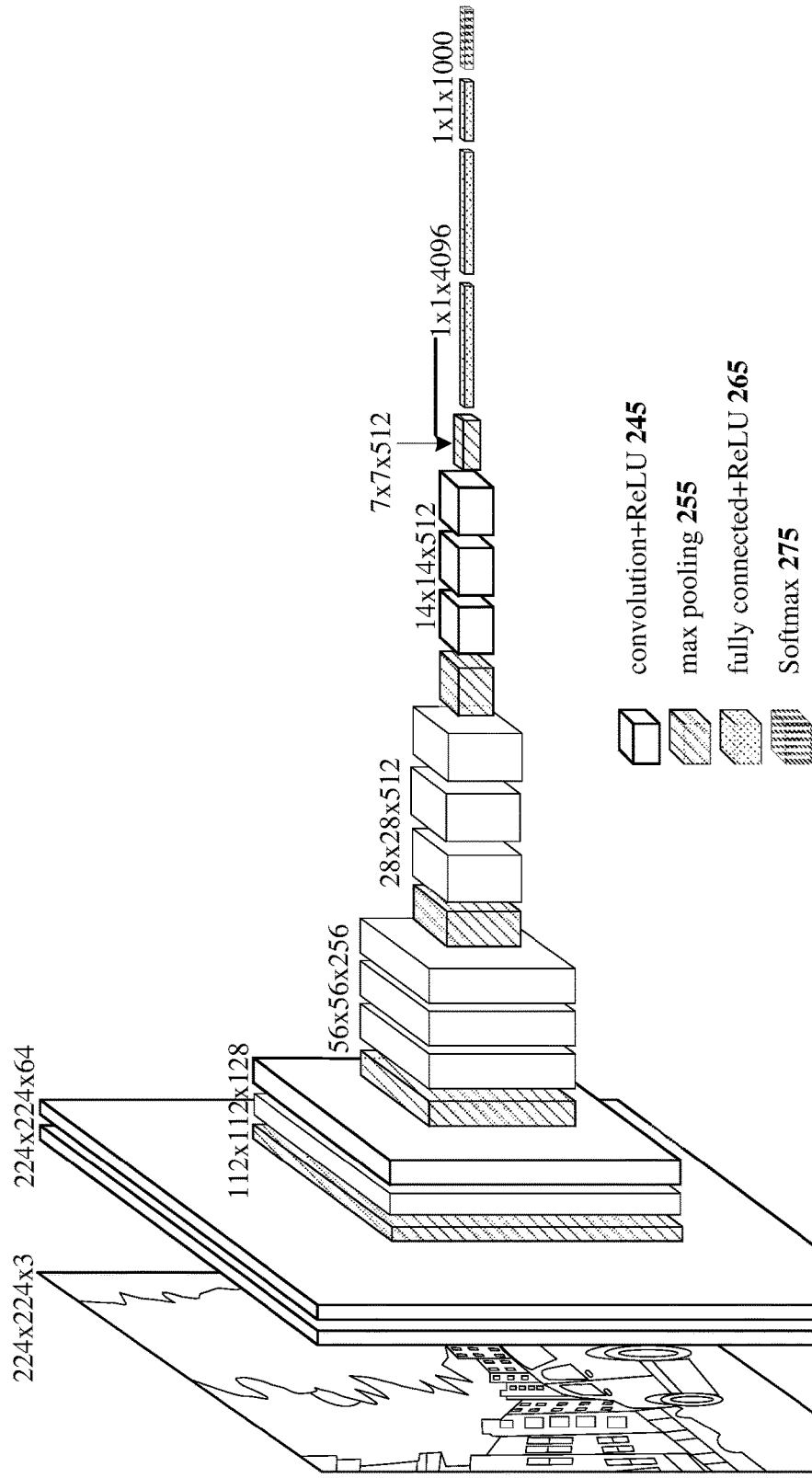
FIG. 2A (Reference)

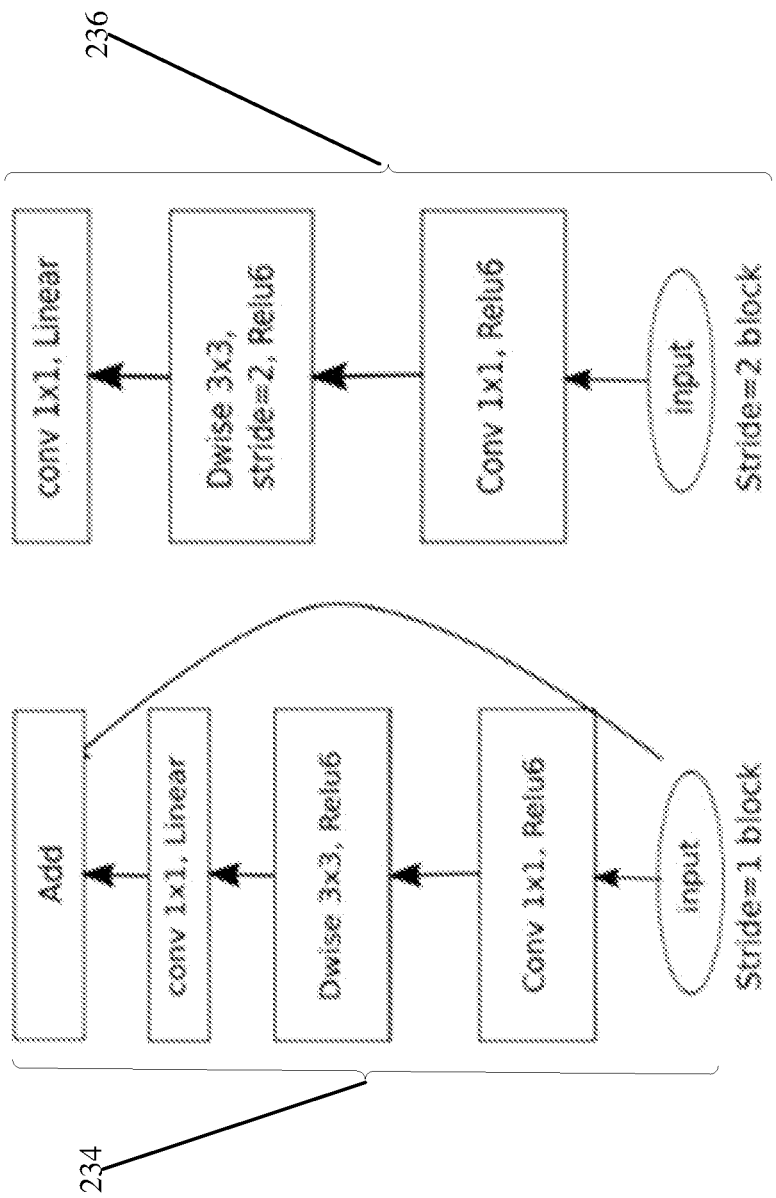
FIG. 2B (Reference)

TYOC Result

Confusion Matrix

|  | others | driver_license |
|---|---|---|
| others | 194 | 6 |
| driver_license | 0 | 197 |

Classification Report

|  | precision | recall | f1-score | support |
|---|---|---|---|---|
| driver_license | 0.97 | 1 | 0.98 | 197 |
| others | 1 | 0.97 | 0.98 | 200 |
| accuracy |  |  | 0.98 | 397 |
| macro avg | 0.99 | 0.98 | 0.98 | 397 |
| weighted avg | 0.99 | 0.98 | 0.98 | 397 |

534

Full Model Result

Confusion Matrix

|  | others | driver_license |
|---|---|---|
| others | 193 | 7 |
| driver_license | 0 | 197 |

Classification Report

|  | precision | recall | f1-score | support |
|---|---|---|---|---|
| driver_license | 0.97 | 1 | 0.98 | 197 |
| others | 1 | 0.96 | 0.98 | 200 |
| accuracy |  |  | 0.98 | 397 |
| macro avg | 0.98 | 0.98 | 0.98 | 397 |
| weighted avg | 0.98 | 0.98 | 0.98 | 397 |

CUSTOMIZED DEEP LEARNING CLASSIFIER FOR DETECTING ORGANIZATION SENSITIVE DATA IN IMAGES ON PREMISES

INCORPORATIONS

The following materials are incorporated by reference in this filing:

U.S. Nonprovisional patent application Ser. No. 17/339,768, filed Apr. 13, 2021, entitled "Deep Learning Stack Used in Production to Prevent Exfiltration of Image-Borne Identification Documents", which is a continuation of U.S. Nonprovisional patent application Ser. No. 16/891,647, filed Jun. 3, 2020, entitled "Detecting Image-Borne Identification Documents for Protecting Sensitive Information", (U.S. Pat. No. 10,990,856, issued Apr. 27, 2021); and U.S. Nonprovisional patent application Ser. No. 17/202,075, filed Mar. 15, 2021, entitled "Training and Configuration of DL Stack to Detect Attempted Exfiltration of Sensitive Screenshot-Borne Data", which is a continuation of U.S. Nonprovisional patent application Ser. No. 16/891,678, filed Jun. 3, 2020, entitled "Detecting Screenshot Images for Protecting Against Loss of Sensitive Screenshot-Borne Data", (U.S. Pat. No. 10,949,961, issued Mar. 16, 2021); and U.S. Nonprovisional patent application Ser. No. 17/116,862, filed Dec. 9, 2020, entitled "Deep Learning-Based Detection and Data Loss Prevention of Image-Borne Sensitive Documents", which is a continuation of U.S. Nonprovisional patent application Ser. No. 16/891,968, filed Jun. 3, 2020, entitled "Detecting Organization Image-Borne Sensitive Documents and Protecting Against Loss of the Sensitive Documents", (U.S. Pat. No. 10,867,073, issued Dec. 15, 2020). These non-provisional applications are incorporated by reference for all purposes.

U.S. Non-Provisional application Ser. No. 14/198,508, entitled "SECURITY FOR NETWORK DELIVERED SERVICES", filed on Mar. 5, 2014 (U.S. Pat. No. 9,270,765, issued on Feb. 23, 2016), U.S. Non-Provisional application Ser. No. 14/198,499, entitled "SECURITY FOR NETWORK DELIVERED SERVICES", filed on Mar. 5, 2014 (U.S. Pat. No. 9,398,102, issued on Jul. 19, 2016), U.S. Non-Provisional application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015 (U.S. Pat. No. 9,928,377, issued on Mar. 27, 2018), U.S. Non-Provisional application Ser. No. 15/368,246, entitled "MIDDLE WARE SECURITY LAYER FOR CLOUD COMPUTING SERVICES", filed on Dec. 2, 2016, which claims the benefit of U.S. Provisional Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016, "Cloud Security for Dummies, Netskope Special Edition" by Cheng, Ithal, Narayanaswamy, and Malmskog, John Wiley & Sons, Inc. 2015, "Netskope Introspection" by Netskope, Inc., "Data Loss Prevention and Monitoring in the Cloud" by Netskope, Inc., "Cloud Data Loss Prevention Reference Architecture" by Netskope, Inc., "The 5 Steps to Cloud Confidence" by Netskope, Inc., "The Netskope Active Platform" by Netskope, Inc.

"The Netskope Advantage: Three "Must-Have" Requirements for Cloud Access Security Brokers" by Netskope, Inc., "The 15 Critical CASB Use Cases" by Netskope, Inc.

"Netskope Active Cloud DLP" by Netskope, Inc.,

"Repave the Cloud-Data Breach Collision Course" by Netskope, Inc.; and

"Netskope Cloud Confidence Index™" by Netskope, Inc.

which are incorporated by reference for all purposes as if fully set forth herein.

FIELD OF THE TECHNOLOGY DISCLOSED

The technology disclosed relates generally to security for network delivered services. In particular it relates to building a customized deep learning (DL) stack classifier to detect organization sensitive data in images, referred to as image-borne organization sensitive documents, under the organization's control, for protecting against loss of the image-borne organization sensitive documents without the organization sharing the image-borne organization-sensitive documents, even with the security services provider. Multiple distinct organizations can utilize the disclosed technology for detecting organization sensitive data in their organization-specific images, so that the organization's images with potentially sensitive data need not be shared to a data loss prevention (DLP) service provider.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Data loss prevention (DLP) technologies have been widely used in the security industry to prevent leaking of sensitive information such as Personally Identifiable Information (PII), Protected Health Information (PHI), Intellectual Property (IP), etc. Both large enterprises and small-to-medium organizations use DLP products. Such sensitive information exists in different sources, including documents and images. For any DLP products, it is crucial to be able to detect the sensitive information in documents and images with high accuracy and computing efficiency.

For text documents, DLP products use string and regular expression based pattern matching to identify sensitive information. For images, optical character recognition (OCR) technologies have been used to extract text characters first. Then the extracted characters are sent to the same pattern matching process to detect sensitive information. Historically OCR does not perform very well due to its high demand on computation resources and unsatisfactory accuracy, especially when the images are not in the ideal condition, such as when blurred, dirty, rotated or flipped.

While training can be automated, there remains the problem of assembling training data in the right formats and sending data to a central node of computation with sufficient storage and compute power. In many fields, sending personally identifiable, private data to any central authority causes worries about data privacy, including data security, data ownership, privacy protection and proper authorization and use of data.

Deep learning applies multi-layered networks to data. Recently deep learning technologies have been increasingly used in image classification. Deep learning can detect images with sensitive information without going through an expensive OCR process. A significant challenge for the deep learning approach is its need for a large number of high-quality labeled images that represent real-world distribution. In the case of DLP, unfortunately the high-quality labeled images typically utilize real images with sensitive information, such as real passport images and real driver's license images. These data sources by nature are challenging to acquire at scale. This limitation hinders the adoption of deep learning based image classification in DLP products.

Additionally, customers may have types of sensitive images and documents that they are interested in protecting, and they cannot share their data with data loss prevention (DLP) security providers due to privacy concerns or legal constraints. Special human resources (HR) documents and particular types of identity cards are examples of the sensitive images and documents.

An opportunity arises to offer a train your own classifier (TYOC) to train machine learning classifiers for detecting organization sensitive data, and to protect against loss of sensitive data in the image-borne organization sensitive documents, for customers who cannot share their sensitive data with DLP security providers. This opportunity can provide a secure and privacy preserving mechanism with a resulting potential consequence of cost and time savings in the security systems utilized by customers who use SaaS.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2A shows a block diagram for using a convolutional neural network (CNN) architecture model for building a customized deep learning (DL) stack classifier to detect organization sensitive data in images and protect against loss of the image-borne organization sensitive documents.

FIG. 2B shows logical blocks of the block diagram of FIG. 2A.

FIG. 5 shows a comparison of the results for the ML models trained with disclosed TYOC to the results for the full model, without TYOC.

DETAILED DESCRIPTION

Figure 1A:
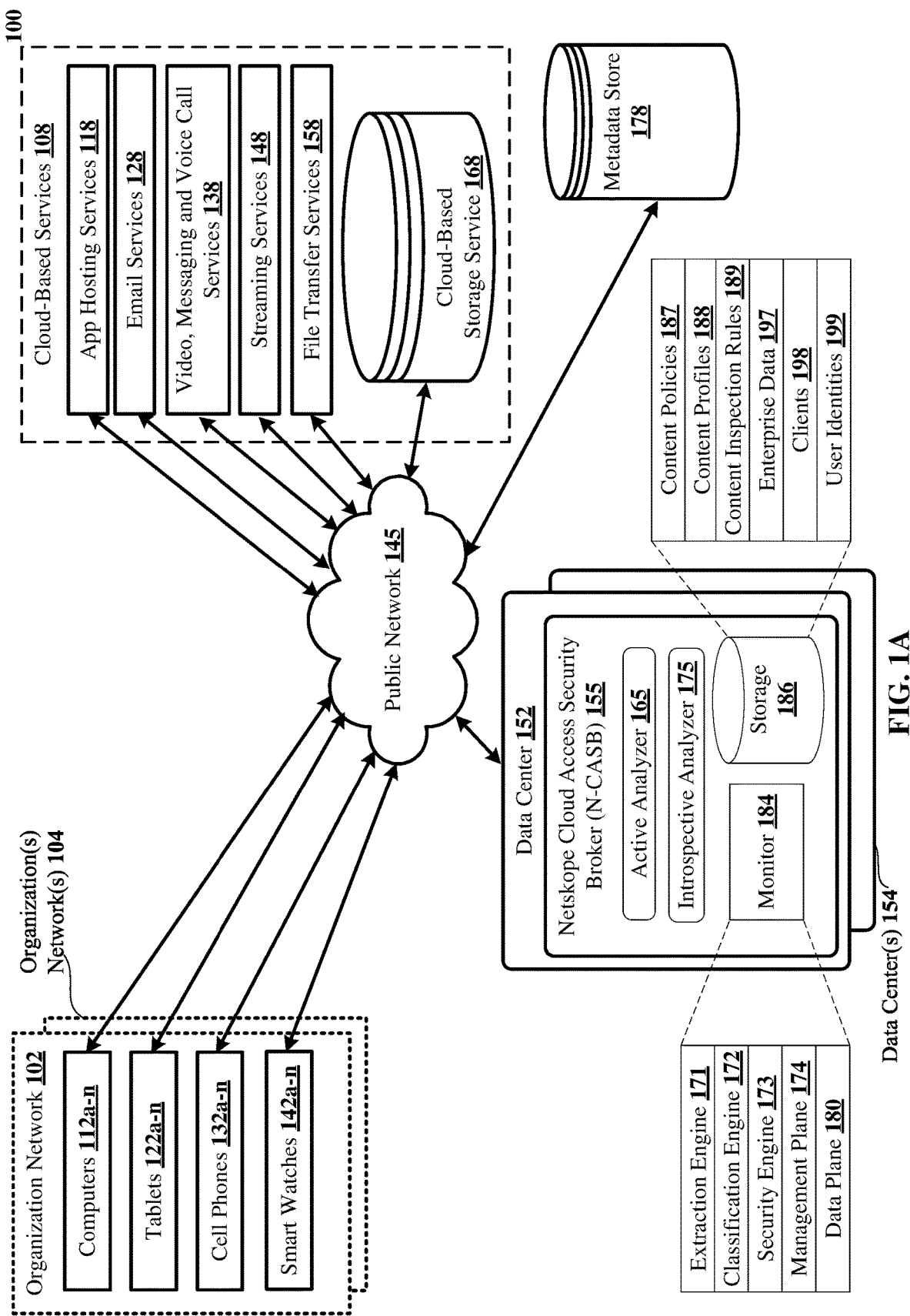
FIG. 1A illustrates an architectural level schematic of a system for building a customized deep learning (DL) stack classifier to detect organization sensitive data in images, referred to as image-borne organization sensitive documents, and protecting against loss of the image-borne organization sensitive documents.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The use of deep learning technologies enhances the detection of sensitive information in documents and images, detecting images with sensitive information without going through existing expensive OCR processes. Deep learning uses optimization to find the optimal parameter values for a model to make the best predictions. Deep learning-based image classification typically requires a large number of labeled images with sensitive information, which are challenging to acquire at scale and this limitation hinders the adoption of deep learning based image classification in DLP products.

Netskope Security Cloud processes millions of document and image files daily, while they are being stored in the cloud storage or transferred through cloud applications. Many of these documents and images contain sensitive information, including confidential legal and financial documents, intellectual property, and customer or employee personally identifiable information (PII). The applicant has developed machine learning-based document and image classifiers, as part of their Netskope cloud access security broker (N-CASB), and NextGen software gateway (SWG) solutions. The machine learning (ML) classifiers, running within the Data Loss Prevention (DLP) service, can accurately classify documents and images into different categories, including tax forms, patents, source code, passports, driver's licenses, payment cards, screenshots, etc. Security administrators can then create DLP policies based on these categories. The ML classifiers provide a fast and effective way to identify sensitive information. They work as a complementary approach to traditional regex based DLP rules, enable granular policy controls in real time, and help organizations comply with compliance regulations and protect their assets.

Using the state-of-the-art deep learning technology and proprietary training datasets, the applicant has developed a set of predefined machine learning classifiers, as part of the Netskope DLP service. However, customers may have new types of sensitive images or documents that they are interested in protecting, and they cannot share their data with the security service to train classifiers, due to privacy concerns or legal constraints. The disclosed Train Your Own Classifier (TYOC) solves this problem by providing a secure and privacy preserving mechanism for training machine learning classifiers, through the use of an on-premises Docker container typically, and can alternatively utilize a different standardized unit of software that allows isolation of an app from its environment, in a different implementation.

The disclosed TYOC first converts documents and images to numeric features, an abstract representation of the input data, inside a container deployed on premises. For documents, the features are embeddings of the text. For images, the features represent the shapes, objects and other qualities to better understand the contents of the image. The random and non-linear transformations in the feature extraction process make it implausible to retrieve the original input files from the features. Data security and privacy concerns are addressed by getting the features only from the Docker container, without having to obtain a copy of original sensitive data.

Customers further develop disclosed custom classifiers using their own sensitive training data, such as medical/design images, human resources (HR) documents, etc. Random and non-linear transformations performed on-premises at an organization make it implausible to retrieve original images. Features are extracted in such a way that when the features are reshaped to a gray scale image, no personally identifiable information (PIT) is revealed.

An example system for building a customized deep learning (abbreviated DL) stack classifier to detect organization sensitive data in images, referred to as image-borne organization sensitive documents, and protecting against loss of the image-borne organization sensitive documents is described next.

Architecture

Figure 1B:
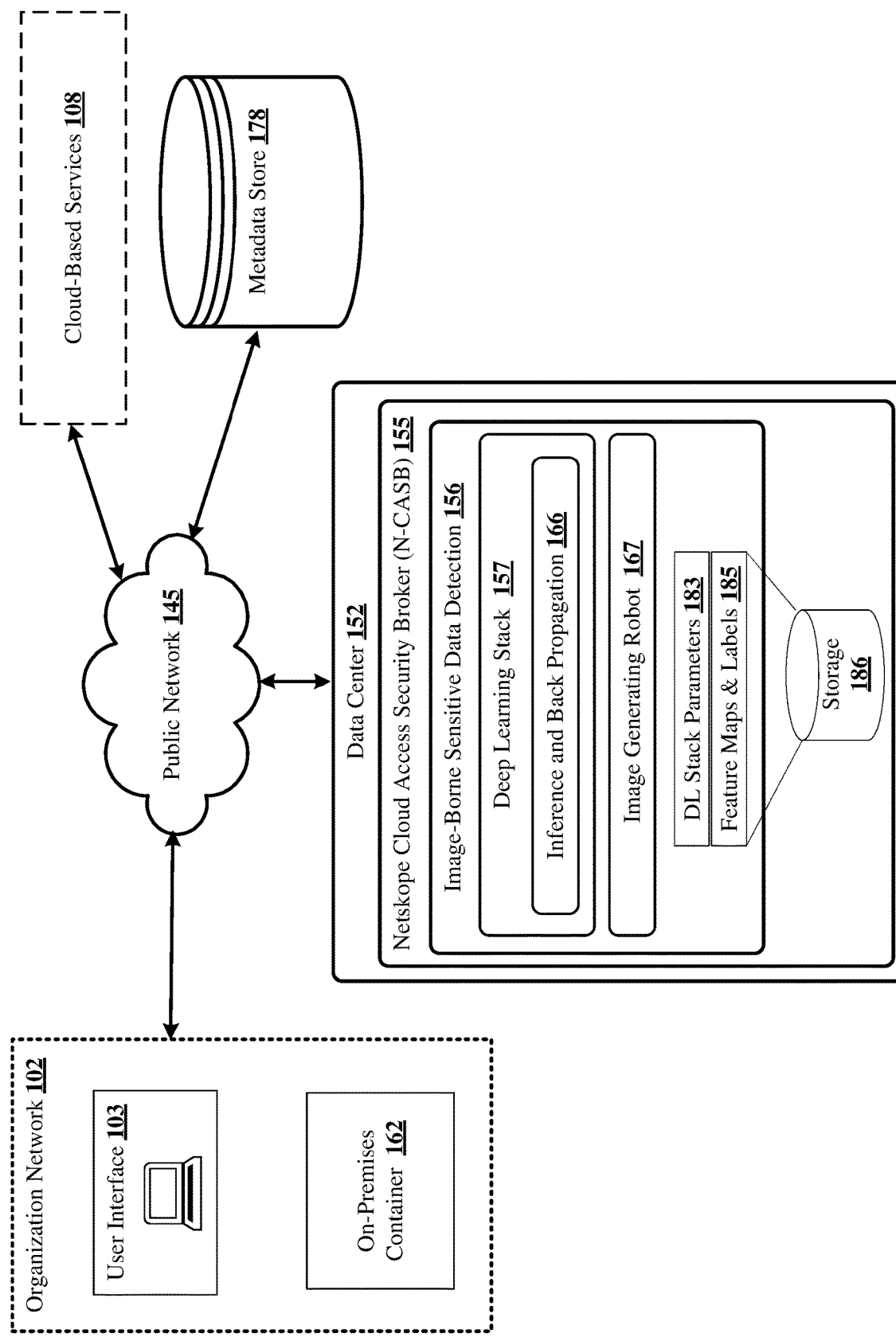
FIG. 1B illustrates a block diagram of image-borne organization sensitive data detection aspects of the system described relative to FIG. 1A.

FIG. 1A shows an architectural level schematic of a system 100 for building a customized deep learning (DL) stack classifier to detect organization sensitive data in images, referred to as image-borne organization sensitive documents, and protecting against loss of the image-borne organization sensitive documents. System 100 can also detect sensitive documents and protect against loss of the sensitive document data. Because FIG. 1A is an architectural diagram, certain details are intentionally omitted to improve clarity of the description. The discussion of FIG. 1A will be organized as follows. First, the elements of the figure will be described, followed by their interconnections. Then, the use of the elements in the system will be described in greater detail. FIG. 1B illustrates image-borne sensitive data detection aspects of the system and is described below.

System 100 includes organization network 102, data center 152 with Netskope cloud access security broker (N-CASB) 155 and cloud-based services 108. System 100 includes multiple organization networks 104 for multiple subscribers, also referred to as multi-tenant networks, of a security services provider and multiple data centers 154, which are sometimes referred to as branches. Organization network 102 includes computers 112a-n, tablets 122a-n, cell phones 132a-n and smart watches 142a-n. In another organization network, organization users may utilize additional devices. Cloud services 108 includes cloud-based hosting services 118, web email services 128, video, messaging and voice call services 138, streaming services 148, file transfer services 158, and cloud-based storage service 168. Data center 152 connects to organization network 102 and cloud-based services 108 via public network 145.

Continuing with the description of FIG. 1A, disclosed enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 utilizes machine learning classification for identity detection and sensitive screenshot detection, further broadening the capability of detecting and enforcing policies on sensitive image content for data loss prevention. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data.

Continuing further with the description of FIG. 1A, N-CASB 155 further includes monitor 184 that includes extraction engine 171, classification engine 172, security engine 173, management plane 174 and data plane 180. Also included in N-CASB 155, storage 186 includes deep learning stack parameters 183, feature maps and labels 185, content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or userid corporate identity directory but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g., Microsoft's Active Directory. Such embodiments may allow policies to be defined in the directory, e.g., either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g., a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested, and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each key space is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1A, system 100 can include any number of cloud-based services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™

In the interconnection of the elements of system 100, network 145 couples computers 112a-n, tablets 122a-n, cell phones 132a-n, smart watches 142a-n, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3 G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1A, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used, and one or more points of presence (POPs) can be established to implement the security functions. The engines or system components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs are hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112a-n, tablets 122a-n, cell phones 132a-n and smart watches 142a-n in organization network 102.

Computers 112a-n, tablets 122a-n, cell phones 132a-n and smart watches 142a-n in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g., a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g., read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246; Cheng, Ithal, Narayanaswamy and Malmskog *Cloud Security For Dummies, Netskope Special Edition*, John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Active Platform*" by Netskope, Inc.; "*The Netskope Advantage: Three "Must-Have" Requirements for Cloud Access Security Brokers*" by Netskope, Inc.; "*The 15 Critical CASB Use Cases*" by Netskope, Inc.; "*Netskope Active CloudDLP*" by Netskope, Inc.; "*Repave the Cloud-Data Breach Collision Course*" by Netskope, Inc.; and "*Netskope Cloud Confidence Index™*" by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance, and/or security. In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™

FIG. 1B illustrates a block diagram of image-borne organization sensitive data detection aspects of system 100, which is described relative to FIG. 1A above, with organization(s) network(s) 102, data center 152 and cloud-based services 108. Each distinct organization network 102 has user interface 103 for interacting with data loss prevention features of the system and has on-premises container 162 for enabling customer organizations to extract feature maps and labels, perform classification of their data, and to perform update training for their image and screenshot classifiers without the organization forwarding its sensitive data in images to a DLP provider that performed the pre-training of the master DL stack. This protects PII data and other sensitive data from being accessible at the data loss prevention provider, thus reducing requirements for protecting stored sensitive data stored at a DLP center. Training for the DL stack is described further below.

Continuing with the description of FIG. 1B, data center 152 has Netskope cloud access security broker (N-CASB) 155 which includes image-borne sensitive data detection 156, with deep learning stack 157 with inference and back propagation 166, and image generating robot 167. Deep learning (DL) stack parameters 183 and feature maps and labels 185 can be saved in storage 186 which is described in detail above. Deep learning stack 157 utilizes extracted feature maps and labels 185 which have been received from a customer, as described below. Image generating robot 167 produces examples of other image documents, which can also be utilized for training deep learning stack 157, in addition to real passport images and US driver license images, in one implementation. In one example, image generating robot 167 crawls US driver's license sample images via a web-based search engine, and inspects the images and filters out low fidelity images. Image generating robot 167 also leverages tools usable for web UI automation to create synthetic data to train deep learning stack 157, collecting examples of the screenshot images and non-screenshot images and creating labelled ground-truth data for the examples, and applying re-rendering of at least some of the collected example screenshot images to represent different variations of screenshots that may contain sensitive information. One example tool is open-source tool Selenium, which can open web browsers, visit web sites, open documents and simulate clicking on the pages. For example, the tool can start with a plain desktop, then open one or multiple web browsers of different sizes in different locations of the desktop, and then visit live web sites or open predefined local documents. These operations can then be repeated with randomized parameters, such as number of browser windows, browser window sizes and locations, relative positioning of the browser windows, etc. Then image generating robot 167 takes screenshots of the desktop and re-renders the screenshots, including augmenting the generated sample images as training data for feeding into DL stack 157. For example, this process can add noise to the images and enhance the robustness of DL stack 157. Augmentations applied to our training data include cropping parts of the image and adjusting hue, contrast and saturation. For detecting screenshot images that people use to exfiltrate data, no flipping or rotation has been added to the image augmentations. For a different example implementation, flipping and rotation could be added to the examples of other image documents.

FIG. 2A shows a block diagram for a convolutional neural network (CNN) architecture model for building a customized deep learning (DL) stack classifier to detect organization sensitive data in images and protect against loss of the image-borne organization sensitive documents. The MobileNet V2 network consists of three layers of residual blocks with stride of one, and blocks with stride of two for downsizing, connected by batch normalizer layers, for this example implementation. For the disclosed transfer learning, the first n layers of the original MobileNet V2 model are fixed, and fully connected layers are added on top, so the network can be separated and re-constructed to develop the train your own classifier (TYOC). The CNN architecture model image was downloaded from https://towardsdatascience.com/covolutional-neural-network-cb0883dd6529 on Apr. 28, 2020. Input to the initial CNN layer is the set of feature maps and labels of the image, represented in a three-dimensional matrix with the image dimension and three color channels: red, green and blue. The input image can be 224×224×3, as depicted in FIG. 2A. In another implementation, the input image can be 200×200×3. In the example implementation for which results are described below, the image size utilized is 160×160×3, with a total of 88 layers.

Continuing the description of DL stack 157, the feature extraction layers are convolution layers 245 and pooling layers 255. The disclosed system stores the feature maps and labels 185 output of the feature extraction layers as numeric values that have been processed through many different iterations of convolution operations, saving non-invertible features instead of raw images. The extracted features cannot be inverted to the original image pixel data. That is, the stored features are non-invertible features. By storing these extracted feature maps instead of the input image data, the DL stack does not store the original image pixels which can carry sensitive and private information such as Personally Identifiable Information (PII), Protected Health Information (PHI) and Intellectual Property (IP).

FIG. 2B shows logical blocks of the block diagram of FIG. 2A, with residual block 234 with stride of one, and downsizing block with stride of two 236. The MobileNet V2 network consists of three layers of both types of blocks, and they are connected by batch normalizer layers. To build the disclosed TYOC container, the technology utilizes transfer learning, fixing the first n layers of the original MobileNet V2 model that implement a feature extractor delivered on-premises to the custom's, and adding fully connected layers as a custom classifier, with no transfer of image-borne organization sensitive documents from the customer organization to the DLP provider.

Figure 3A:
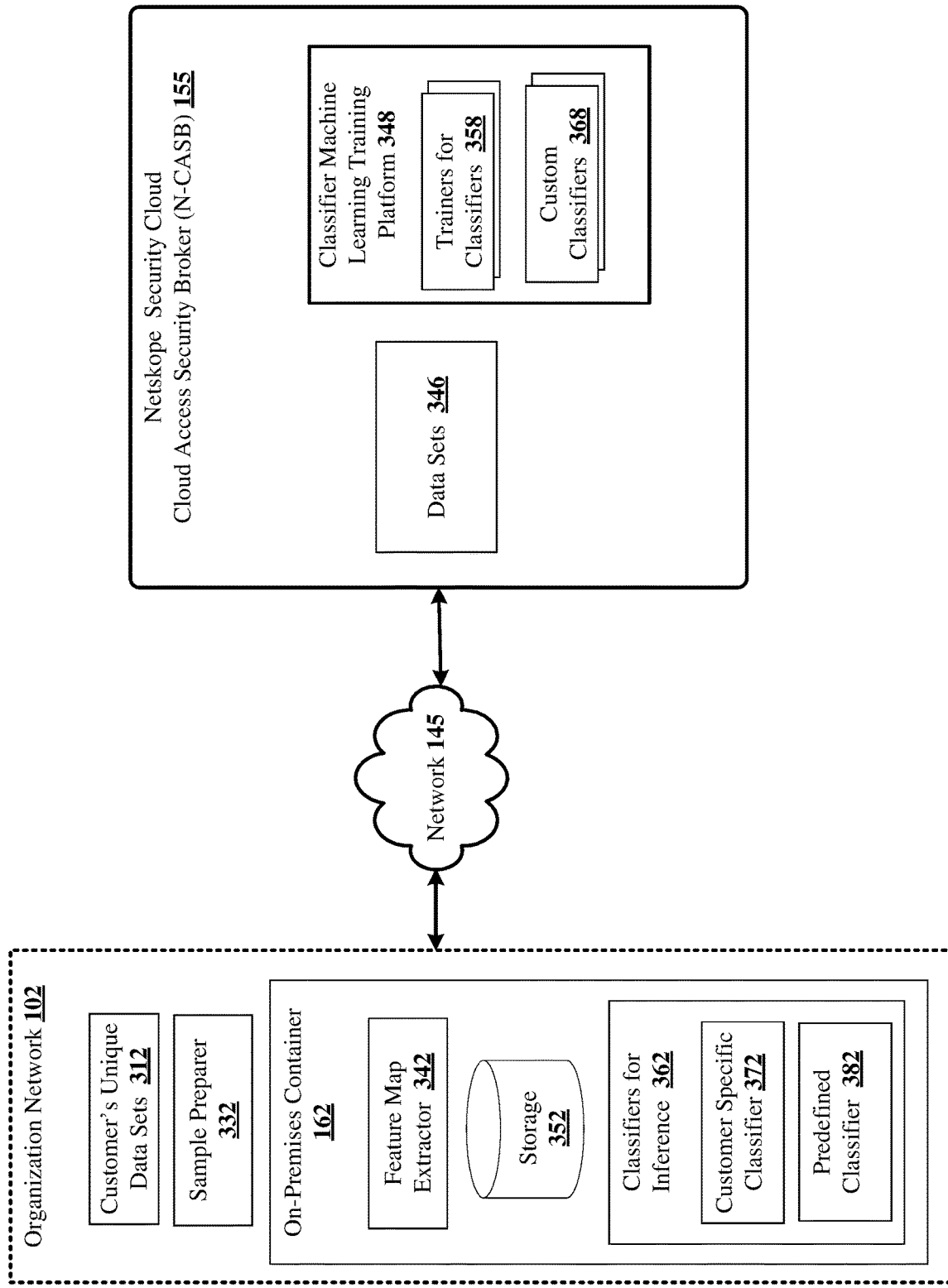
FIG. 3A shows block diagram details for building a customized deep learning (DL) stack classifier to detect organization sensitive data in images and protecting against loss of the image-borne organization sensitive documents.

FIG. 3A shows block diagram details for building a customized deep learning (DL) stack classifier to detect organization sensitive data in images and protecting against loss of the image-borne organization sensitive documents. The block diagram includes organization network 102 and Netskope cloud access security broker (N-CASB) 155. Organization network 102 captures the customer's unique data sets 312 and prepares samples from the data sets using sample preparer 332. On-premises container 162 contains feature map extractor 342 and classifiers for inference 362. N-CASB 155 includes classifier machine learning (ML) training platform 348 with trainers for classifiers 358 and custom classifiers 368 and data sets 346. Classifier ML training platform 348 provides a custom classifier 368 to an organization, as a customer specific classifier 372 and/or a predefined classifier 382. Customer specific classifier 374 and predefined classifier 382 are two example classifiers for inference 362. Classifier ML training platform 348 utilizes dedicated trainers for classifiers 358 to generate the respective custom classifier 368 for an organization. Customers can develop custom classifiers using their own sensitive training data, such as medical/design images, human resources (HR) documents, etc. Classifier ML training platform 348 delivers custom classifier 368 to the organization in on-premise container 162 as customer specific classifier 372 under the organization's control, in one implementation. Customer specific classifier 372 can be trained to identify new types of images or documents that customers are interested in protecting, such as a particular type of identity card, special HR documents, and critical infrastructure images. In one example, pre-defined image classifiers include classifiers for a passport book, driver's license, screenshot, social security card (US) and payment card for credit and for debit cards.

Classifier ML training platform 348 receives the extracted features from a customer, and can further train customer specific classifier 372 using additional training samples from a corpus of feature maps and ground truth labels for images. When a new classifier is available, the customer can test it with more image-borne organization sensitive document samples in the on-premises container. After the classifier has achieved satisfactory accuracy based on testing, it is then ready to be deployed into the DLP service in the customer's tenant and used to detect sensitive information in documents or images within their corporate traffic.

Figure 3B:
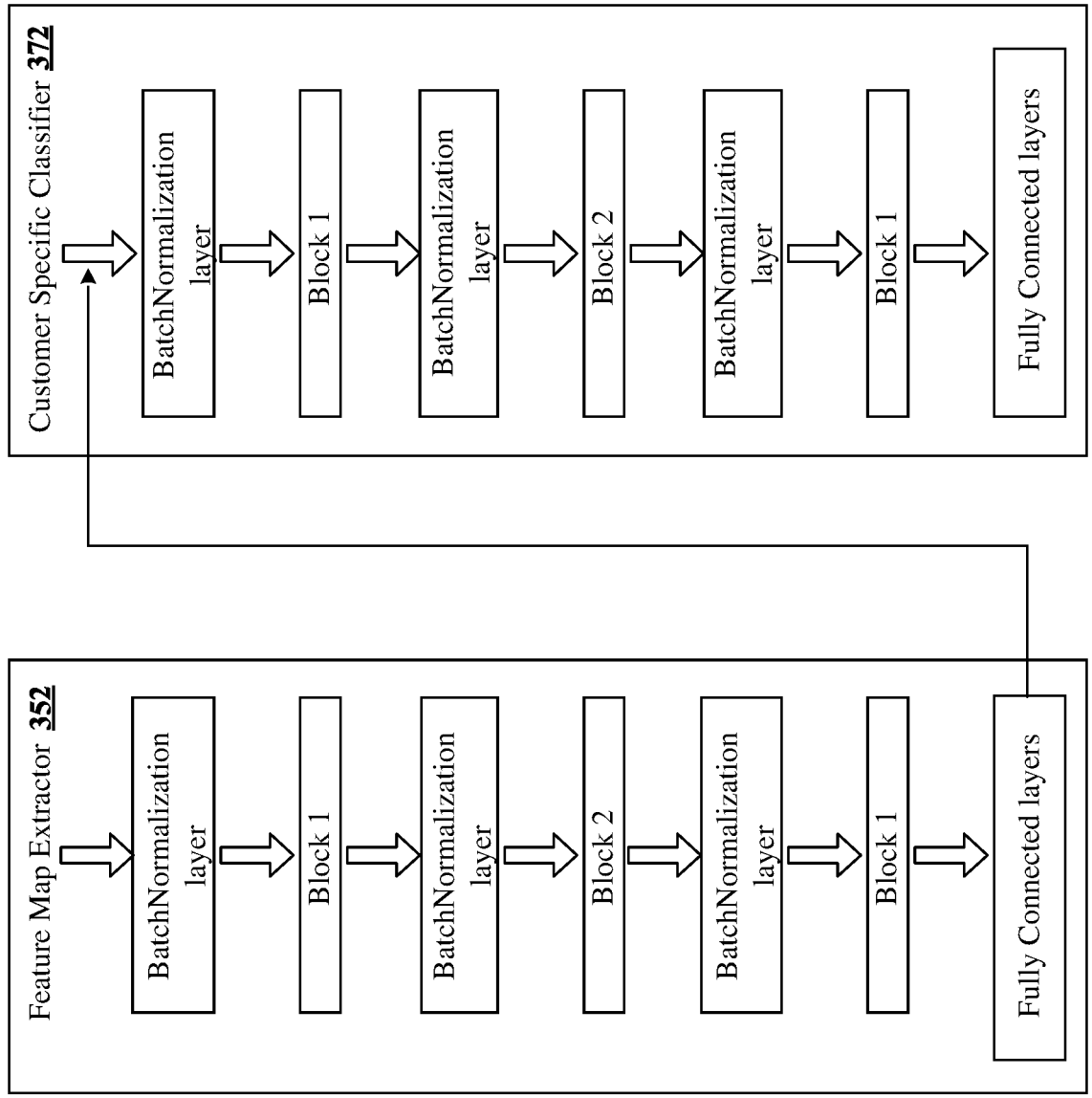
FIG. 3B illustrates the use of a CNN architecture model, such as the one shown in FIG. 2A, for the disclosed building of the deep learning stack classifier.

FIG. 3B displays the modules used for building the disclosed customized deep learning (DL) stack classifier, illustrating the use of a convolutional neural network (CNN) architecture model, such as the one shown in FIG. 2A, for the disclosed building. Classifier ML training platform 348 provides feature map extractor 342 which utilizes a first set of layers closer to an input layer in the model. Feature map extractor 342 converts documents and images to numeric features, an abstract representation of the input data, inside a container deployed on premises. For documents, the features are embeddings of the text. For images, the features represent the shapes, objects and other qualities to better understand the contents of the image. The random and non-linear transformations in the feature extraction process make it implausible to retrieve the original input files from the features. In one example, for 1,000 images, the extracted feature maps may take up to 3 GB disk space. Data security and privacy concerns are addressed by getting the feature maps and ground truth labels only from the Docker container, without obtaining a copy of original sensitive data. Supported image formats include (a) Windows bitmaps—*.bmp, *.dib; (b) JPEG files—*.jpeg, *.jpg, *.jpe; (c) Portable Network Graphics—*.png; (d) WebP—*.webp; € Portable image format—*.pbm, *.pgm, *.ppm *.pxm, *.pnm; (f) PFM files—*.pfm; (g) Sun rasters—*.sr, *.ras; (h) TIFF files—*.tiff, *.tif; (i) OpenEXR Image files—*.exr; (j) Radiance HDR—*.hdr, *.pic; and (k) Raster and Vector geospatial data supported by GDAL, in one implementation. Additional image formats can be supported in a different implementation.

The disclosed classifier ML training platform 348 freezes the first n layers as a first set of layers. The pre-trained first set of layers captures feature maps and ground truth labels for a customer's unique data sets 312. For the private image-borne identification documents and for screenshot images, the CNN architecture model captures features and produces an output feature map from the first set of layers and retains the captured feature maps together with respective ground truth labels, thereby eliminating any need to retain images of the private image-borne identification documents and without sending personally identifiable, private data to even the data loss prevention (DLP) service provider, or any central authority.

Continuing the description of FIG. 3B, classifier ML training platform 348 receives the feature maps and ground truth labels from the on-premises container and utilizes them for training custom classifier 368. Customer specific classifier 372 utilizes fully connected layers 265 and SoftMax layers 275 that comprise a second set of layers further from the input layer of the CNN model which is trained and utilized to detect image-borne organization sensitive documents at the customer's on-premises location. Classifier ML training platform 348 provides customer specific classifier 372 to the customer.

The disclosed technology stores parameters of the trained organization DL stack in storage 352 for inference from production images in the customer's unique data sets 312, and uses a production DL stack with the stored parameters to classify production images by inference as containing an image-borne organization sensitive identification document in one use case or an image-borne sensitive screenshot image in another case.

Figure 4:
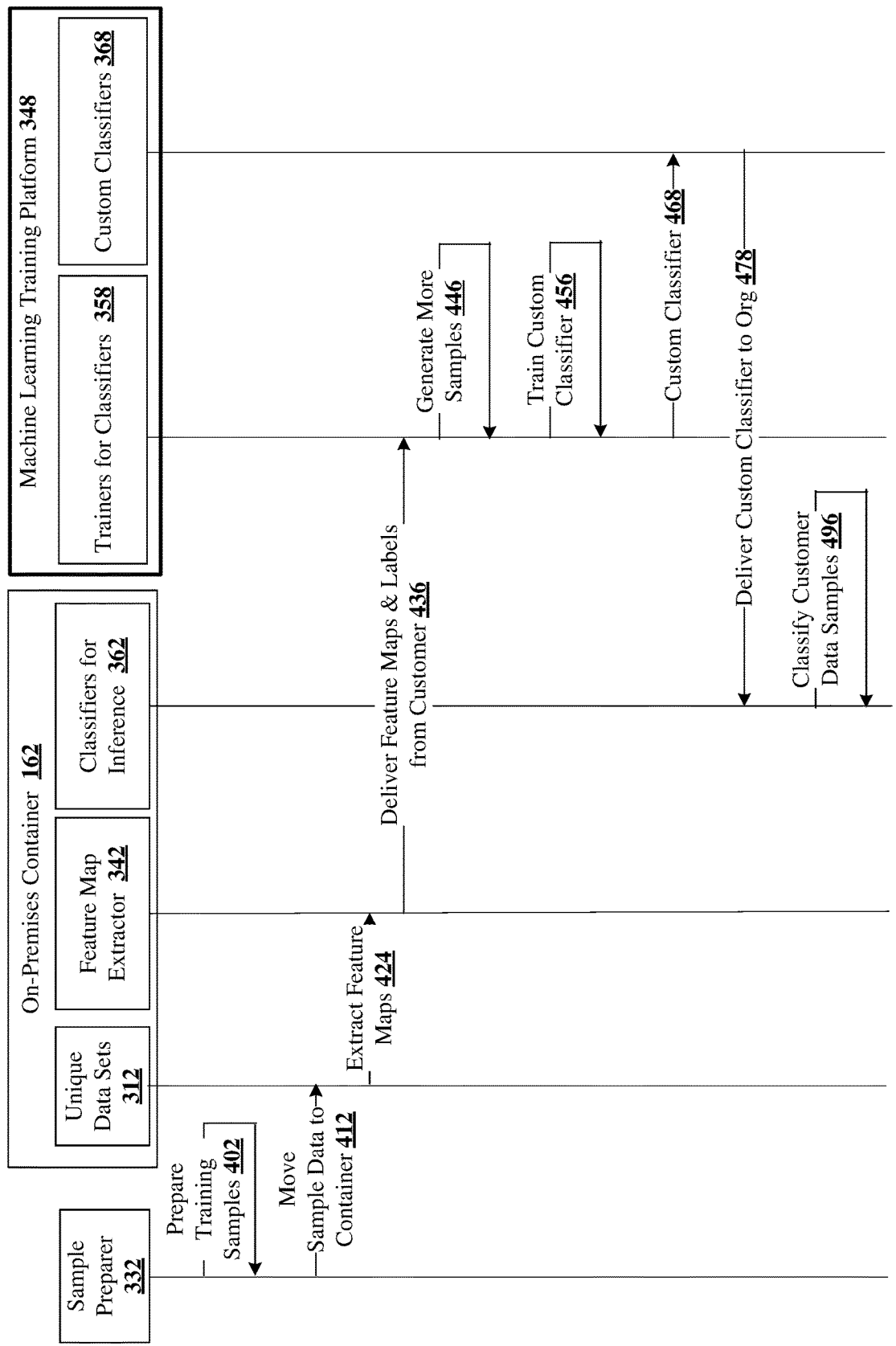
FIG. 4 illustrates the process flow for building a customized DL stack classifier to detect organization sensitive data in images.

FIG. 4 illustrates an example process flow for building a customized deep learning (DL) stack classifier to detect organization sensitive data in images. Classifier ML training platform 348 distributes a trained feature map extractor 342 stack with stored parameters as an on-premises container 162 that runs under the organization's control, and is configured to allow the organization to extract from image-borne organization sensitive documents, feature maps that are used to generate updated DL stacks, without the organization forwarding images of organization-sensitive training examples, and to save non invertible feature maps derived from the images, and ground truth labels for the images. Sample preparer 332 prepares training samples 402 from the customer's unique data and transfers the prepared sample data 412 to customer's unique data sets 312 in on-premises container 162. Feature map extractor 342 extracts feature maps 424 from the unique data sets 312 and delivers the extracted feature maps and ground truth labels 436 from the data sets to trainers for classifiers 358.

Continuing the description of the process shown in FIG. 4, trainers for classifiers 358 receive organization-specific examples including the non-invertible feature maps extracted from the organization-sensitive documents and the ground truth labels. Classifier ML training platform 348 can add additional training samples from the stored corpus and train custom classifiers 456 for individual customers, using the received organization-specific examples to generate a customer-specific DL stack classifier 368. Classifier ML training platform 348 sends the customer-specific DL stack classifier to the organization 478. In one implementation, the custom classifier 368 can potentially be delivered as an add-on to feature map extractor 342. Classifiers for inference 362 can then classify customer data samples 496 on-premises at the organization, with no transfer of organization sensitive data in images, thus protecting against loss of the image-borne organization sensitive documents.

FIG. 5 shows a comparison of the results for the ML models trained with disclosed TYOC 534 to the results for the full model 564, without TYOC. The comparison shows nearly identical accuracy results from the two models.

Figure 6:
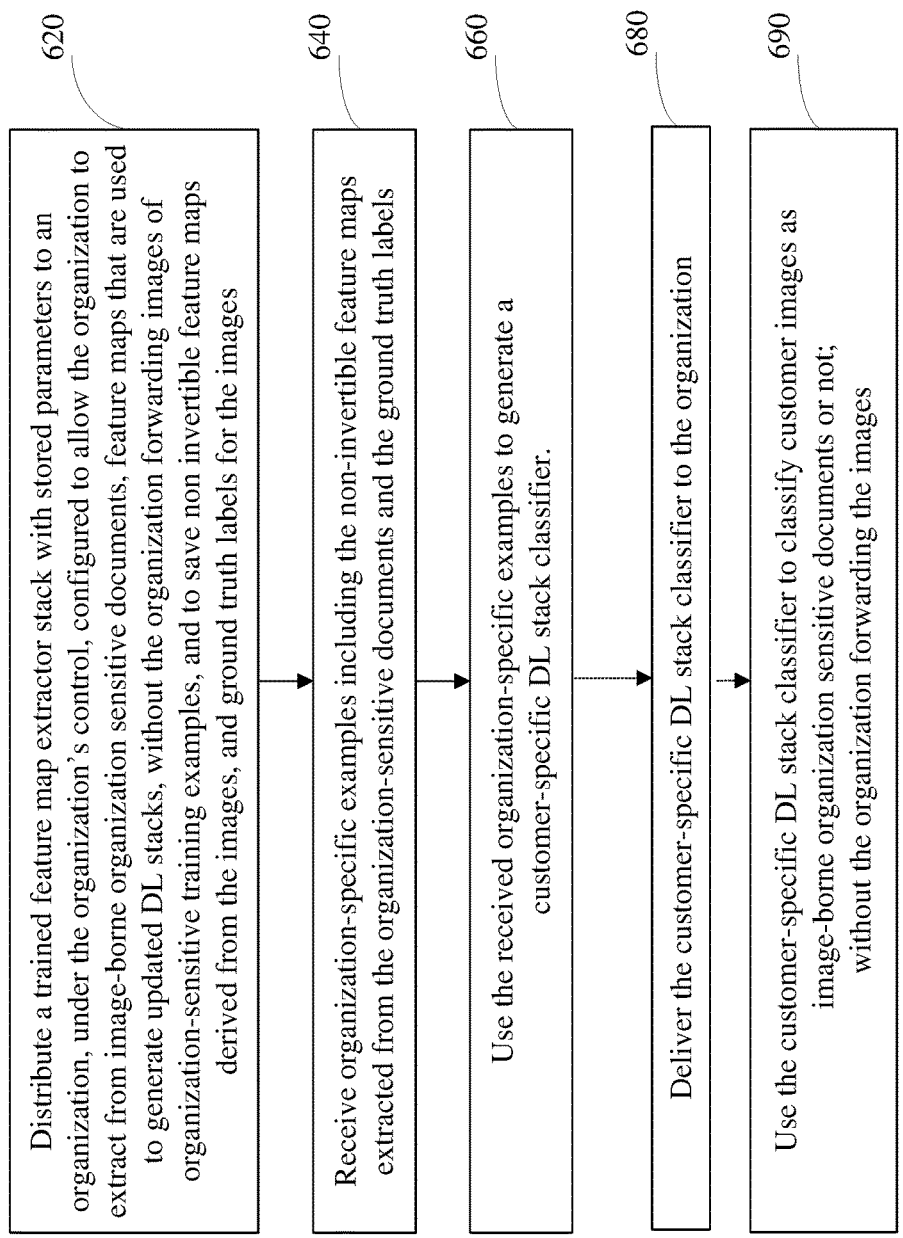
FIG. 6 shows an example workflow for building a customized deep learning (DL) stack classifier to detect organization sensitive data in images, referred to as image-borne organization sensitive documents, and protecting against loss of the image-borne organization sensitive documents.

FIG. 6 shows an example workflow 600 for building a customized deep learning (DL) stack classifier to detect organization sensitive data in images, referred to as image-borne organization sensitive documents, and protecting against loss of the image-borne organization sensitive documents. First, select a pre-trained network, such as the CNN described relative to FIG. 2A above. DL stack includes at least a first set of layers closer to an input layer and a second set of layers further from the input layer, with the first set of layers being pre-trained as a train your own classifier (TYOC) to extract features. In the described example a MobileNet CNN for detecting images was selected. A different CNN or even a different ML classifier can be selected.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method of building a customized deep learning stack classifier to detect organization sensitive data in images. The computer-implemented method of building includes distributing a trained feature map extractor stack with stored parameters to an organization, under the organization's control, configured to allow the organization to extract from image-borne organization sensitive documents, feature maps that are used to generate updated dl stacks, without the organization forwarding images of organization-sensitive training examples, and to save non invertible feature maps derived from the images, and ground truth labels for the images 620. Step 640 includes receiving organization-specific examples including the non-invertible feature maps extracted from the organization-sensitive documents and the ground truth labels, and step 660 includes using the received organization-specific examples to generate a customer-specific dl stack classifier. Other embodiments of this aspect include corresponding computer systems, apparatus, and computer programs recorded on one or more computer storage devices, each configured to perform the actions of the methods.

Implementations may include one or more of the following features. The computer-implemented method further including sending the customer-specific dl stack classifier to the organization 680. Implementations of the described techniques may include hardware, a method or process, or computer software on a computer-accessible medium. Step 690 describes optionally using the customer-specific DL stack classifier to classify customer images as image-borne organization sensitive documents or not, without the organization forwarding the images off-premises, for protecting against loss of the image-borne organization sensitive documents.

Next, we describe an example computer system useable for building a customized deep learning (DL) stack classifier to detect organization sensitive data in images, referred to as image-borne organization sensitive documents, and protecting against loss of the image-borne organization sensitive documents.

Computer System

Figure 7:
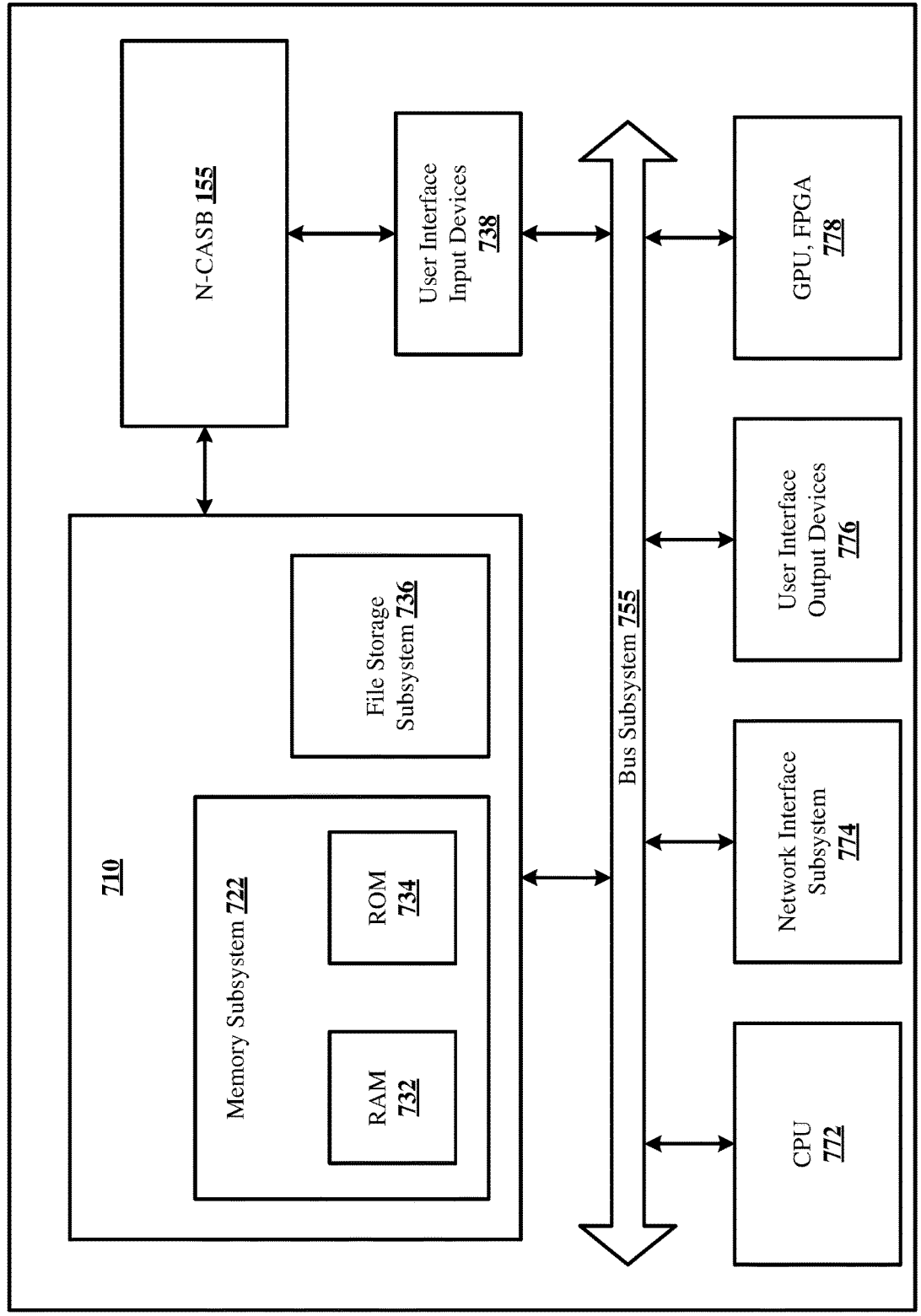
FIG. 7 is a simplified block diagram of a computer system that can be used to implement building a customized deep learning (DL) stack classifier to detect organization sensitive data in images and protect against loss of the image-borne organization sensitive documents, according to one embodiment of the disclosed technology.

FIG. 7 is a simplified block diagram of a computer system 700 that can be used for building a customized deep learning (DL) stack classifier to detect organization sensitive data in images, referred to as image-borne organization sensitive documents, and protecting against loss of the image-borne organization sensitive documents. Computer system 700 includes at least one central processing unit (CPU) 772 that communicates with a number of peripheral devices via bus subsystem 755, and Netskope cloud access security broker (N-CASB) 155 for providing network security services described herein. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems.

In one implementation, Netskope cloud access security broker (N-CASB) 155 of FIG. 1A and FIG. 1B is communicably linked to the storage subsystem 710 and the user interface input devices 738.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Memory subsystem 722 used in the storage subsystem 710 can include a number of memories including a main random access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 755 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 700 depicted in FIG. 7 is intended only as a specific example for purposes of illustrating the preferred embodiments of the present invention. Many other configurations of computer system 700 are possible having more or less components than the computer system depicted in FIG. 7.

Particular Implementations

Some particular implementations and features for building a customized deep learning (DL) stack classifier to detect organization sensitive data in images, referred to as image-borne organization sensitive documents, and protecting against loss of the image-borne organization sensitive documents are described in the following discussion.

In one disclosed implementation, a method of building a customized DL stack classifier to detect organization sensitive data in images, referred to as image-borne organization sensitive documents, and protecting against loss of the image-borne organization sensitive documents includes distributing a trained feature map extractor stack with stored parameters to an organization, under the organization's control, configured to allow the organization to extract from image-borne organization sensitive documents, feature maps that are used to generate updated DL stacks, without the organization forwarding images of organization-sensitive training examples, and to save non invertible feature maps derived from the images, and ground truth labels for the images. The method also includes receiving organization-specific examples including the non-invertible feature maps extracted from the organization-sensitive documents and the ground truth labels, and using the received organization-specific examples to generate a customer-specific DL stack classifier.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some disclosed implementations of the method further include sending the customer-specific DL stack classifier to the organization. Some implementations include delivering the customer-specific DL stack classifier to the organization as an add-on to the feature map extractor stack.

For some disclosed implementations of the method, the image-borne organization sensitive documents are identification documents. In some cases, the identification documents in images are one of passport book, driver's license, social security card and payment card.

In another implementation, the image-borne organization sensitive documents are screenshot images.

For one disclosed implementation of the method, optical character recognition (OCR) analysis of images is applied to label the images as identification documents or non-identification documents. Highly confident classifications can be selected after the OCR analysis, for use in the training set. OCR and regular expression matching serve as an automated way of generating labelled data from a customer's production images. In one example, for US passports, OCR first extracts the text on the passport page. Then regular expressions can match "PASSPORT", "UNITED STATES", "Department of State", "USA", "Authority", and other words on the page. In a second example, for California driver's licenses, OCR first extracts the text on the front of the driver's license. Then regular expressions can match "California", "USA", "DRIVER LICENSE", "CLASS", "SEX", "HAIR", "EYES" and other words on the front page. In a third example, for Canadian passports, OCR first extracts the text on the passport page. Then regular expressions can match "PASSPORT", "PASSEPORT", "CANADA" and other words on the page.

Some disclosed implementations of the method include distorting in perspective the received organization-specific examples to produce a second set of the image-borne organization sensitive documents and using both the received organization-specific examples and the distorted in perspective examples to generate a customer-specific DL stack classifier.

For other disclosed implementations of the method, the received organization-specific examples are distorted by rotation to produce a third set of the image-borne identification documents and combining the first and third sets with the labelled ground truth data to generate a customer-specific DL stack classifier.

For one disclosed implementation of the method, the received organization-specific examples are distorted by noise to produce a fourth set of the image-borne identification documents and combining the first and fourth sets with the labelled ground truth data to generate a customer-specific DL stack classifier.

For some disclosed implementations of the method, the received organization-specific examples are distorted in focus to produce a fifth set of the image-borne identification documents and combining the first and fifth sets with the labelled ground truth data to generate a customer-specific DL stack classifier.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of building a customized deep learning (abbreviated DL) stack classifier to detect organization sensitive data in images, referred to as image-borne organization sensitive documents, and protecting against loss of the image-borne organization sensitive documents, including:

distributing a trained feature map extractor stack with stored parameters to an organization, under the organization's control, configured to allow the organization to extract from image-borne organization sensitive documents, feature maps that are used to generate updated DL stacks, without the organization forwarding images of organization-sensitive training examples, and to save non invertible feature maps derived from the images, and ground truth labels for the images;

receiving organization-specific examples including the non-invertible feature maps extracted from the organization-sensitive documents and the ground truth labels; and using the received organization-specific examples to generate a customer-specific DL stack classifier.

2. The computer-implemented method of claim 1, further including sending the customer-specific DL stack classifier to the organization.

3. The computer-implemented method of claim 1, further including delivering the customer-specific DL stack classifier to the organization as an add-on to the feature map extractor stack.

4. The computer-implemented method of claim 1, wherein the image-borne organization sensitive documents are identification documents.

5. The computer-implemented method of claim 4, wherein the identification documents in images are one of passport book, driver's license, social security card and payment card.

6. The computer-implemented method of claim 1, wherein the image-borne organization sensitive documents are screenshot images.

7. The computer-implemented method of claim 1, further including distorting in perspective the received organization-specific examples to produce a second set of the image-borne organization sensitive documents and using both the received organization-specific examples and the distorted in perspective examples to generate a customer-specific DL stack classifier.

8. A tangible non-transitory computer readable storage media, including program instructions loaded into memory that, when executed on processors, cause the processors to implement a method of building a customized deep learning (abbreviated DL) stack classifier to detect organization sensitive data in images, referred to as image-borne organization sensitive documents, and protecting against loss of the image-borne organization sensitive documents, the method including:
  distributing a trained feature map extractor stack with stored parameters to an organization, under the organization's control, configured to allow the organization to extract from image-borne organization sensitive documents, feature maps that are used to generate updated DL stacks, without the organization forwarding images of organization-sensitive training examples, and to save non invertible feature maps derived from the images, and ground truth labels for the images;
  receiving organization-specific examples including the non-invertible feature maps extracted from the organization-sensitive documents and the ground truth labels; and
  using the received organization-specific examples to generate a customer-specific DL stack classifier.

9. The tangible non-transitory computer readable storage media of claim 8, further including sending the customer-specific DL stack classifier to the organization.

10. The tangible non-transitory computer readable storage media of claim 8, further including delivering the customer-specific DL stack classifier to the organization as an add-on to the feature map extractor stack.

11. The tangible non-transitory computer readable storage media of claim 8, wherein the image-borne organization sensitive documents are identification documents in images.

12. The tangible non-transitory computer readable storage media of claim 11, wherein the identification documents in images are one of passport book, driver's license, social security card and payment card.

13. The tangible non-transitory computer readable storage media of claim 8, wherein the image-borne organization sensitive documents are screenshot images.

14. The tangible non-transitory computer readable storage media of claim 8, further including distorting in perspective the received organization-specific examples to produce a second set of the image-borne organization sensitive documents and using both the received organization-specific examples and the distorted in perspective examples to generate a customer-specific DL stack classifier.

15. A system for building a customized deep learning (abbreviated DL) stack classifier to detect organization sensitive data in images, referred to as image-borne organization sensitive documents, and protecting against loss of the image-borne organization sensitive documents, the system including a processor, memory coupled to the processor, and computer instructions that, when executed on the processors, implement actions comprising:
  distributing a trained feature map extractor stack with stored parameters to an organization, under the organization's control, configured to allow the organization to extract from image-borne organization sensitive documents, feature maps that are used to generate updated DL stacks, without the organization forwarding images of organization-sensitive training examples, and to save non invertible feature maps derived from the images, and ground truth labels for the images;
  receiving organization-specific examples including the non-invertible feature maps extracted from the organization-sensitive documents and the ground truth labels; and
  using the received organization-specific examples to generate a customer-specific DL stack classifier.

16. The system of claim 15, further including sending the customer-specific DL stack classifier to the organization.

17. The system of claim 15, further including delivering the customer-specific DL stack classifier to the organization as an add-on to the feature map extractor stack.

18. The system of claim 15, wherein the image-borne organization sensitive documents are identification documents in images.

19. The system of claim 15, wherein the image-borne organization sensitive documents are screenshot images.

20. The system of claim 15, further including distorting in perspective the received organization-specific examples to produce a second set of the image-borne organization sensitive documents and using both the received organization-specific examples and the distorted in perspective examples to generate a customer-specific DL stack classifier.

* * * * *